United States Patent
Sasoglu et al.

(10) Patent No.: US 10,887,863 B2
(45) Date of Patent: Jan. 5, 2021

(54) RECEIVER FOR SECURE TIME-OF-ARRIVAL CALCULATION

(71) Applicant: Apple Inc., Cupertino, CA (US)

(72) Inventors: Eren Sasoglu, Mountain View, CA (US); Joachim S. Hammerschmidt, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/805,243

(22) Filed: Feb. 28, 2020

(65) Prior Publication Data

US 2020/0280952 A1    Sep. 3, 2020

Related U.S. Application Data

(60) Provisional application No. 62/812,445, filed on Mar. 1, 2019.

(51) Int. Cl.
*H04W 64/00* (2009.01)
*H04W 4/80* (2018.01)
*H04W 84/12* (2009.01)
*H04L 25/02* (2006.01)
*H04W 4/029* (2018.01)

(52) U.S. Cl.
CPC ....... *H04W 64/006* (2013.01); *H04L 25/0212* (2013.01); *H04W 4/029* (2018.02); *H04W 4/80* (2018.02); *H04W 84/12* (2013.01)

(58) Field of Classification Search
CPC ..... H04W 64/006; H04W 4/029; H04W 4/80; H04L 25/0212
USPC ................... 455/456.3, 450, 418, 422.1, 423
See application file for complete search history.

(56) References Cited

U.S. PATENT DOCUMENTS

| | | | |
|---|---|---|---|
| 2003/0036359 A1* | 2/2003 | Dent ...................... | H04B 7/022 455/63.1 |
| 2015/0050944 A1* | 2/2015 | Ekbatani ................. | H04W 4/35 455/456.1 |
| 2019/0036745 A1* | 1/2019 | Dzung .............. | H04L 25/03159 |

* cited by examiner

*Primary Examiner* — Nghi H Ly
(74) *Attorney, Agent, or Firm* — Sterne, Kessler, Goldstein & Fox P.L.L.C.

(57) ABSTRACT

Some embodiments include an apparatus, method, and computer program product for secure time-of-arrivals calculations in an ultra-wideband (UWB) system. Some embodiments include a UWB receiver that can inspect a channel impulse response (CIR) between a first and second electronic device and identify one or more first path candidates (FPCs). For a candidate path, the UWB receiver can identify subsequent paths that create inter-pulse interference (IPI) on the candidate path. Using estimates for the interfering path strengths (e.g., channel coefficients from the CIR) and the known cryptographically sequence of pulse polarities (SPP), the UWB receiver can reduce the IPI from these interfering paths on the FPCs, and then make decisions based at least on the remaining pulse polarities, whether the one or more FPCs comprise a legitimate transmission signal.

20 Claims, 13 Drawing Sheets

RECEIVER FOR SECURE TIME-OF-ARRIVAL CALCULATION

CROSS-REFERENCE TO RELATED APPLICATIONS

This application claims benefit of U.S. Application No. 62/812,445, filed on Mar. 1, 2019, entitled, Receiver for Secure Time-of-Arrival Calculation, which is incorporated herein by reference in its entirety.

BACKGROUND

Field

The described embodiments relate generally to wireless communication, including the use of ultra wideband packets.

Related Art

Ultra-wideband (UWB) systems provide for wireless communication using low power, short range, and moderate data rate pulse streams that spread their energy across a very wide frequency bandwidth. UWB transmissions use a combination of burst position modulation (BPM) and binary phase shift keying (BPSK) to transform binary data into a stream of pulses (the time interval associated with a pulse is also referred to as a chip). The Institute of Electrical and Electronics Engineers (IEEE) 802.15 working group specifies wireless personal area networking (WPAN) standards, including a lower power WPAN communication protocol 802.15.4 that defines data packet formats for various low rate and high rate wireless WPANs. Wireless packet transmissions typically begin with a preamble used for detecting the transmission, acquiring synchronization timing and frequency, adaptively training receiver settings, and estimating a transmission channel. The preamble usually includes a series of repeated predetermined pseudo random (PR) sequences having desired autocorrelation properties. As the PR sequences are known in advance, a receiver can correlate received data to locate the PR sequence and detect the start of a wireless packet transmission. As the set of possible preamble PR sequences used are known and each preamble includes multiple repetitions of a selected PR sequence, a malicious actor may monitor wireless transmissions, detect the PR sequence, and transmit using the detected PR sequence as part of an attempt to spoof a receiver into falsely detecting the malicious actor as a valid transmitter.

SUMMARY

In some embodiments, a wireless transmission is received and a receiver utilizes channel impulse response (CIR) estimates and a sequence of pulse polarities (SPP), known only to the receiver and the legitimate transmitter, to determine whether the wireless transmission is received is indeed a legitimate transmission of the SPP. If the wireless transmission received is instead a spoofed transmission, then the receiver utilizes CIR estimates and the SPP to determine that the wireless transmission received is not a legitimate transmission. Thus, some embodiments of the disclosure are an improvement over first-path extraction systems because some embodiments can distinguish a legitimate transmission from a spoofed transmission.

Some embodiments include an apparatus, method, and computer program product for secure time-of-arrival calculations. For example, some embodiments include obtaining an SPP, receiving a wireless transmission, and estimating a CIR based at least on the wireless transmission received. Some embodiments include identifying one or more First Path Candidates (FPCs), and for each FPC, estimating a location of one or more samples of the wireless transmission that correspond respectively to that FPC of each pulse polarity of the SPP, reducing inter-pulse interference (IPI) from the one or more samples based on the SPP and the estimated CIR to generate one or more IPI reduced samples (IRS), and determining, based at least on the IRS, SPP, and the CIR, whether the wireless transmission is a transmission.

To reduce the IPI from the one or more samples, some embodiments can estimate, based at least on the CIR and the SPP, the interference on the one or more samples from previous pulses of the SPP. In some embodiments, the estimated interference can be canceled out of the one or more samples to generate IPI reduced samples (IRS) of an FPC. The IRS of an FPC is then compared with the SPP to determine whether the FPC corresponds to a transmission of the SPP. When the comparison yields a high similarity metric between the IRS and the SPP, the FPC is confirmed as a legitimate transmission; otherwise, the FPC is considered a fake or spoofed transmission. Thus, some embodiments strengthen the physical layer security of first path extraction.

In some embodiments, the estimating the received polarity sequence includes equalizing the IRS of an FPC, and determining pulse polarities of the equalized IRS. The SPP can be a cryptographically secure pulse sequence (CSPS) representing a training sequence of a physical layer protocol data unit (PPDU). The PPDU can be an Ultra-wideband (UWB) packet. Note that the terms SPP and CSPS can be used interchangeably in this document. In some embodiments, the comparing of the IRS with the SPP includes computing a correlation between the IRS and the SPP, computing a sample norm of the IRS, and comparing the correlation with the sample norm. The sample norm can be a square-root of a sum of squared magnitudes of the IRS. Further, the comparing the correlation with the sample norm can include computing a ratio between a magnitude of the correlation and a magnitude of the sample norm, and determining whether the ratio computed satisfies (e.g., exceeds) a configurable threshold.

BRIEF DESCRIPTION OF THE FIGURES

The accompanying drawings, which are incorporated herein and form part of the specification, illustrate the presented disclosure and, together with the description, further serve to explain the principles of the disclosure and enable a person of skill in the relevant art(s) to make and use the disclosure.

Figure 1A:
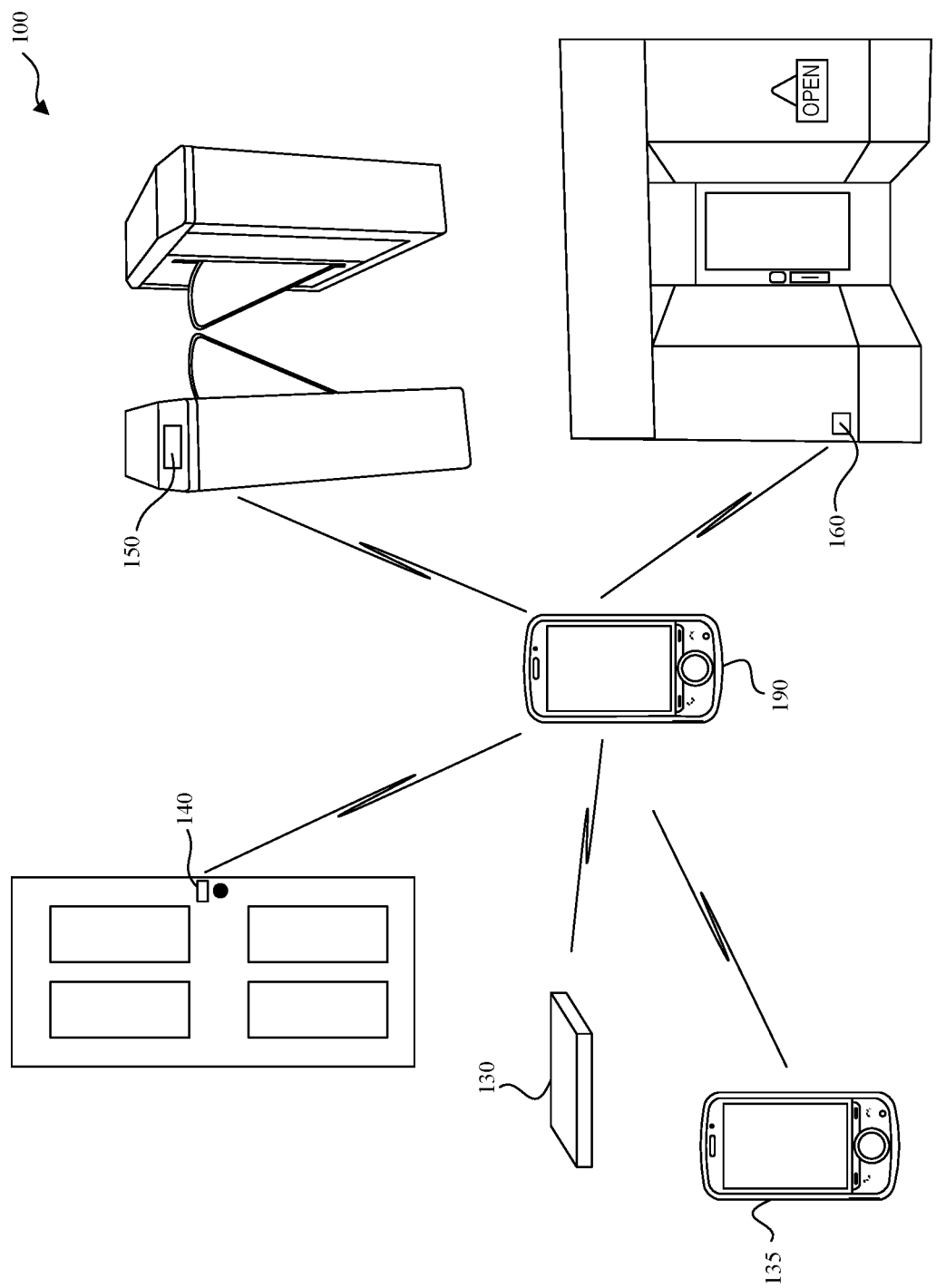
FIG. 1A illustrates an example system implementing receivers for secure time-of-arrival calculations, in accordance with some embodiments of the disclosure.

The presented disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Secure ranging in Ultra-wideband (UWB) systems may rely on the exchange of a sequence of pulse polarities (SPP) for time-of-arrival calculations. Pulse polarities are generated by a cryptographically secure pseudo-random number generator, which may be seeded with a different key for every ranging exchange. The key may be known only to the appropriate ranging parties. One approach to secure time-of-arrival calculation is to pass the received SPP through a correlator and extract the first path from the resulting channel impulse response (CIR). But, this opens up the possibility for attackers to create strong contributions to the correlator output at the receiver simply by injecting random energies while adjusting the transmit power, without having to correctly guess the true SPP. The generally desired ability to extract weak first paths gives an attacker even more room to play with power levels. Thus, relying on CIRs alone may be vulnerable to attacks. Some embodiments include a system, method, and computer program product that strengthen the security of physical layer for reception of the SPP.

Some embodiments include an apparatus, method, and computer program product for secure time-of-arrival calculations in UWB systems. Some embodiments are directed to a UWB receiver in an electronic device that receives UWB signals from a second electronic device. The UWB receiver can inspect the channel impulse response (CIR) between the first and second electronic devices and identify one or more first path candidates (FPCs) (e.g., based on a non-secure preamble CIR or an SPP CIR). For an FPC, the UWB receiver can identify the samples that correspond to an FPC, as well as paths in the CIR that create inter-pulse interference (IPI) on each sample of the FPC. For example, if the pulses of the SPP are separated by T nanoseconds, then samples of an FPC can have IPI from paths that are multiples of T nanoseconds later than that FPC. Each FPC may have a different set of interfering paths, or even different samples of a single FPC may have IPI from different paths, for example if the pulse spacing is not uniform. Using estimates for the interfering path strengths (e.g., channel coefficients from the CIR) and the known SPP, the UWB receiver can cancel out the IPI from these later paths on an FPC, and then make decisions on pulse polarities. If an FPC for which the fraction of decisions that match the SPP satisfies (e.g., is higher than) a configurable threshold, the UWB receiver can accept that FPC as a first path. The threshold may be determined based factors including, but not limited to the desired level of security (e.g., false alarm probability) and/or the number of pulses in the SPP.

FIG. 1A illustrates an example system 100 implementing receivers for secure time-of-arrival calculations, according to some embodiments of the disclosure. Example system 100 is provided for the purpose of illustration only and is not limiting of the disclosed embodiments. System 100 may include but is not limited to wireless communication devices 190, 135, vehicular transponder device 130, entry transponder device 140, ticket entry device 150, and proximity detection device 160. Other devices that may benefit from some or all of the embodiments—which are not shown in FIG. 1 for simplicity purposes—may include other computing devices including but not limited to laptops, desktops, tablets, personal assistants, routers, monitors, televisions, printers, household devices (e.g., thermostat), and appliances. Example uses may include access to a device once in proximity.

When wireless communication device 190 is in proximity (e.g., a hundred meters) to vehicular transponder device 130 or entry transponder device 140, some embodiments may enable a corresponding car door or entry (e.g., entry of a door to a house, an office, or a building) to be unlocked or opened. Likewise, when wireless communication device 190 is in proximity of ticket entry device 150, some embodiments allow a ticket (e.g., a concert ticket, a metro rail ticket, or a sport event ticket) associated with wireless communication device 190 to be recognized, validated, and allow a ticket holder (via wireless communication device 190) entry to the venue. Ticket entry device 150 may include other implementations including but not limited to a turnstile that permits entry, or an automatic gate that unlocks or opens. Proximity detection device 160 may detect a potential customer with wireless communication device 190 near a store front and transmit a promotional coupon or advertisement to wireless communication device 190 to entice the potential customer to visit the store. Likewise, wireless communication device 135 of a first user may recognize when wireless communication device 190 of a second user is in proximity and send an invitation to wireless communication device 190 to invite the second user to meet (e.g., helps friends and family members find each other). In another example (not shown), settings of a household device (e.g., a thermostat) may be adjusted to preferences associated with or stored on wireless communication device 190 as wireless communication device 190 comes into proximity. In another example, a leash tag (not shown) may be a removable device attached to a pet collar or clothing of a wandering toddler where secure communications between the leash tag and wireless communication device 190 result in an alarm notification on wireless communication device 190 when the leash tag exceeds a configurable distance threshold from wireless communication device 190.

The above wireless communication devices can be portable or mobile and can determine relative positions and/or distances with each other. Some wireless devices may be stationary (e.g., proximity detection device 160) and may determine absolute positions or geographic locations.

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) Long Term Evolution (LTE), LTE Advanced (LTE-A), and/or fifth generation (5G) or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

Figure 3A:
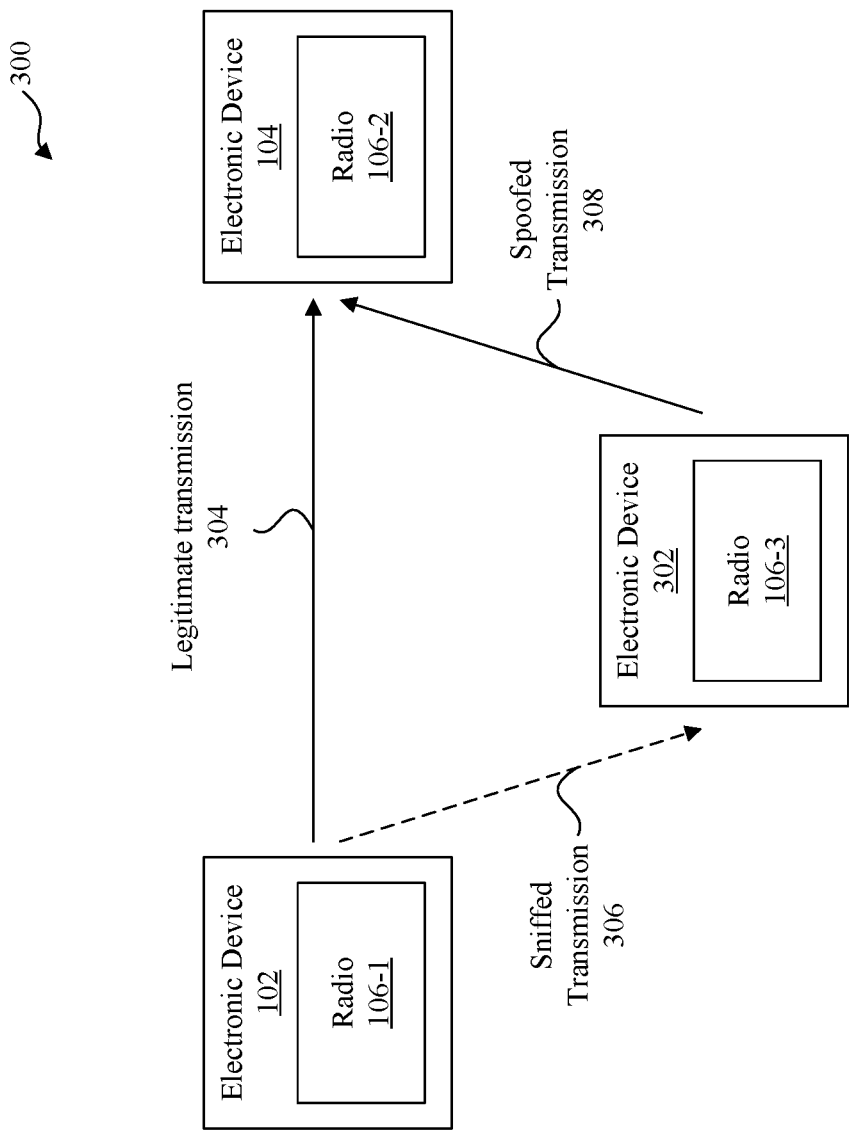
FIG. 3A illustrates a diagram of an example of a malicious actor electronic device interfering with communication between a set of electronic devices, in accordance with some embodiments of the disclosure.
Figure 3B:
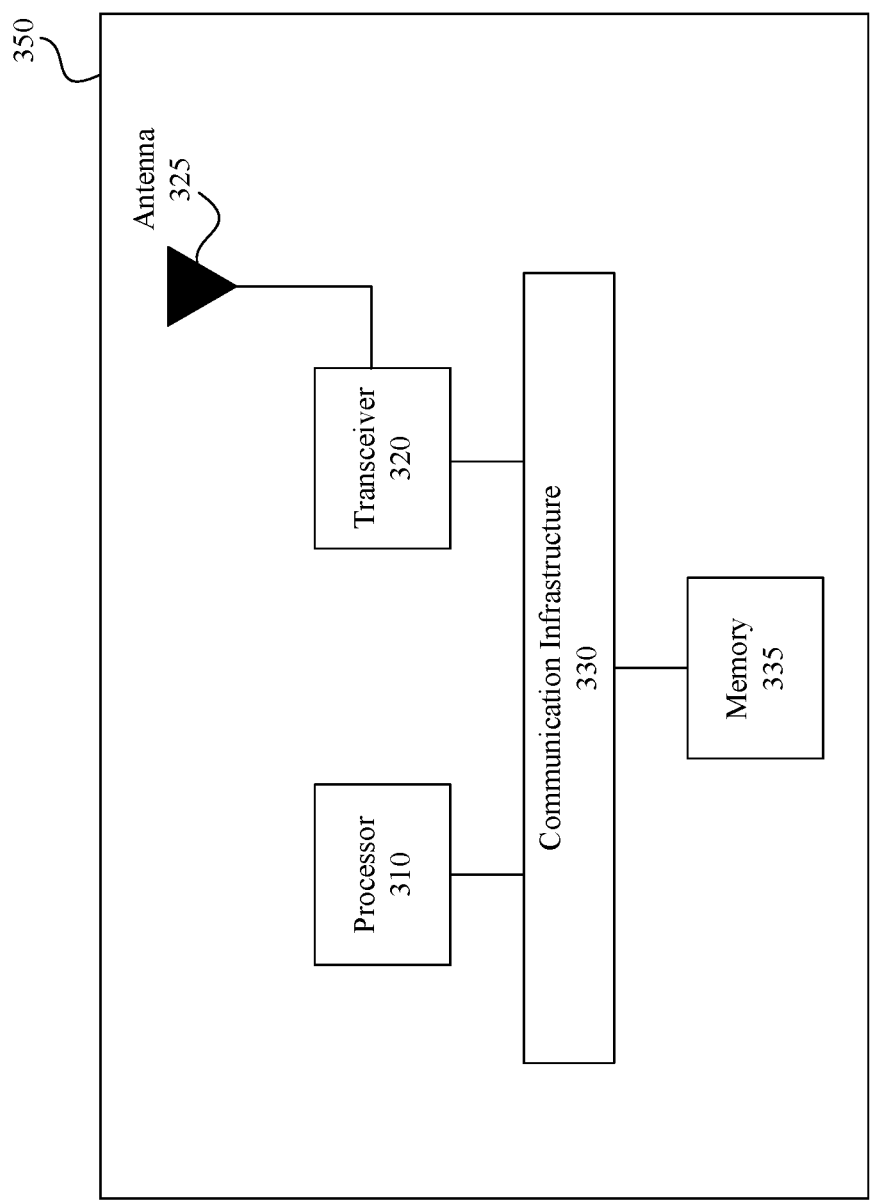
FIG. 3B illustrates a block diagram of an example wireless system with a receiver for secure time-of-arrival calculations, according to some embodiments of the disclosure.

FIG. 3B illustrates a block diagram of an example wireless system 350 with a receiver (e.g., within transceiver 320) for secure time-of-arrival calculations, according to some embodiments of the disclosure. As a convenience and not a limitation, FIG. 3B, may be described with elements of FIGS. 1A, 1B, and 1C. System 350 may be any of the devices (e.g., 130, 135, 140, 150, 160, and/or 190) of system 100. System 350 may include processor 310, transceiver 320, communication infrastructure 330, memory 335, and antenna 325 that together perform operations enabling wireless communications including secure channel estimation. Transceiver 320 transmits and receives communications signals including PPDU (e.g., PPDU 210 or 260) for secure channel estimation according to some embodiments, and may be coupled to antenna 325. Communication infrastructure 330 may be a bus. Memory 335 may include random access memory (RAM) and/or cache, and may include control logic (e.g., computer software) and/or data. Antenna 325 coupled to transceiver 320, may include one or more antennas that may be the same or different types.

Figure 1B:
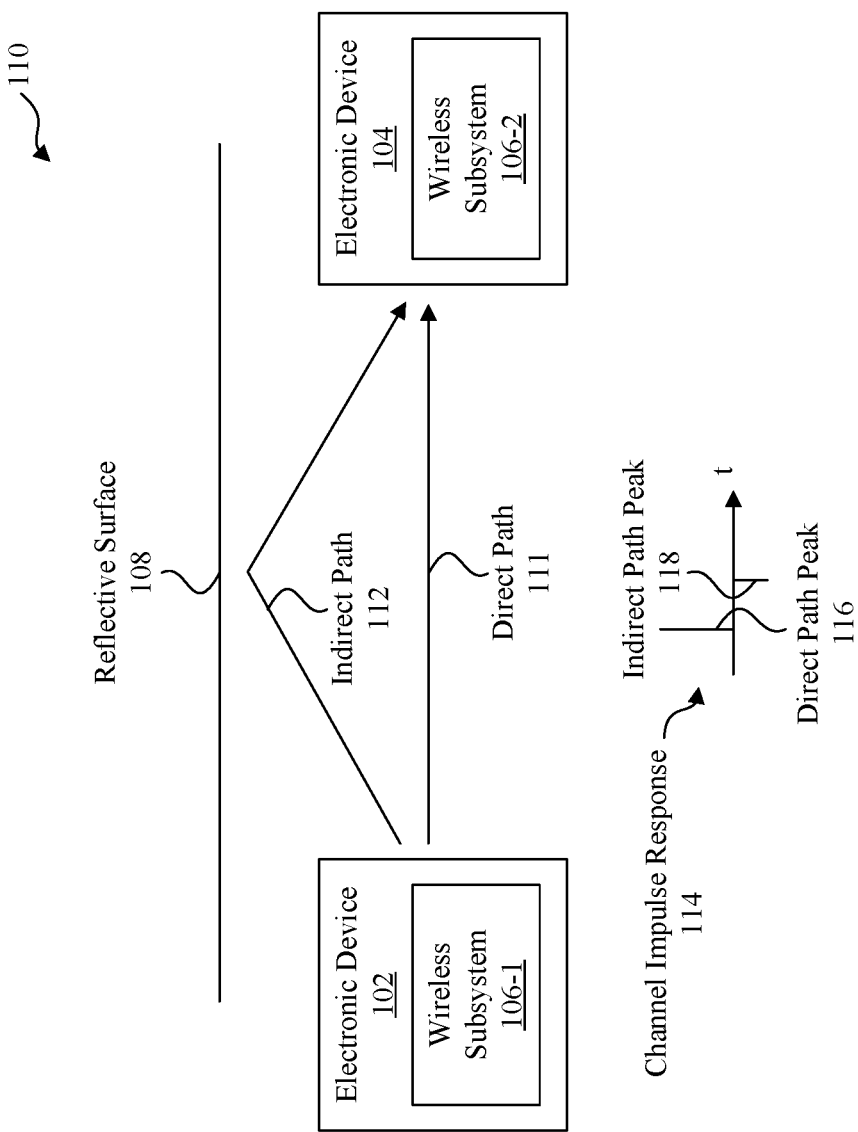
FIG. 1B illustrates a diagram of an exemplary set of electronic devices with multipath reflection, in accordance with some embodiments of the disclosure.

FIG. 1B illustrates a diagram 110 of an exemplary set of electronic devices 102, 104 with multi-path reflection. In this example, electronic devices 102 and 104 can be any two devices of system 100 of FIG. 1A such as wireless communication device 190 and ticket entry device 150. Electronic device 102 may send a transmission, e.g., one or more wireless packets, using wireless subsystem 106-1 to electronic device 104, which receives the transmission using wireless subsystem 106-2. Wireless subsystems 106-1 and 106-2 may include a system 350 of FIG. 3B to implement the wireless transmission. The transmission may traverse a direct path 111, which may represent a shortest distance path, from electronic device 102 to electronic device 104. The transmission may also traverse an indirect path 112 from electronic device 102 to electronic device 104, which may represent a longer distance path due to an echo from a reflective surface 108. While there may be any number of propagation paths, with any combination of strong and weak path strengths, the two-path description that follows is chosen for the sake of simplicity and is notmeant to be limiting. Electronic device 104 can correlate pre-determined sequences included in the transmission to estimate a channel impulse response (CIR) 114 based on received samples that include a combination of the transmissions via direct path 111 and indirect path 112. Channel impulse response 114 can include a stronger direct path peak 116 and a weaker indirect path peak 118. Electronic device 104 can use the estimated channel impulse response 114 to estimate a distance between electronic device 102 and electronic device 104, which can also be referred to as wireless ranging. For wireless ranging, the second electronic device 104 must distinguish between different peaks in the estimated channel impulse response 114 to locate direct path 111 and also separate the channel impulse response from ambient noise to accurately determine the distance between electronic devices 102 and 104.

Figure 1C:
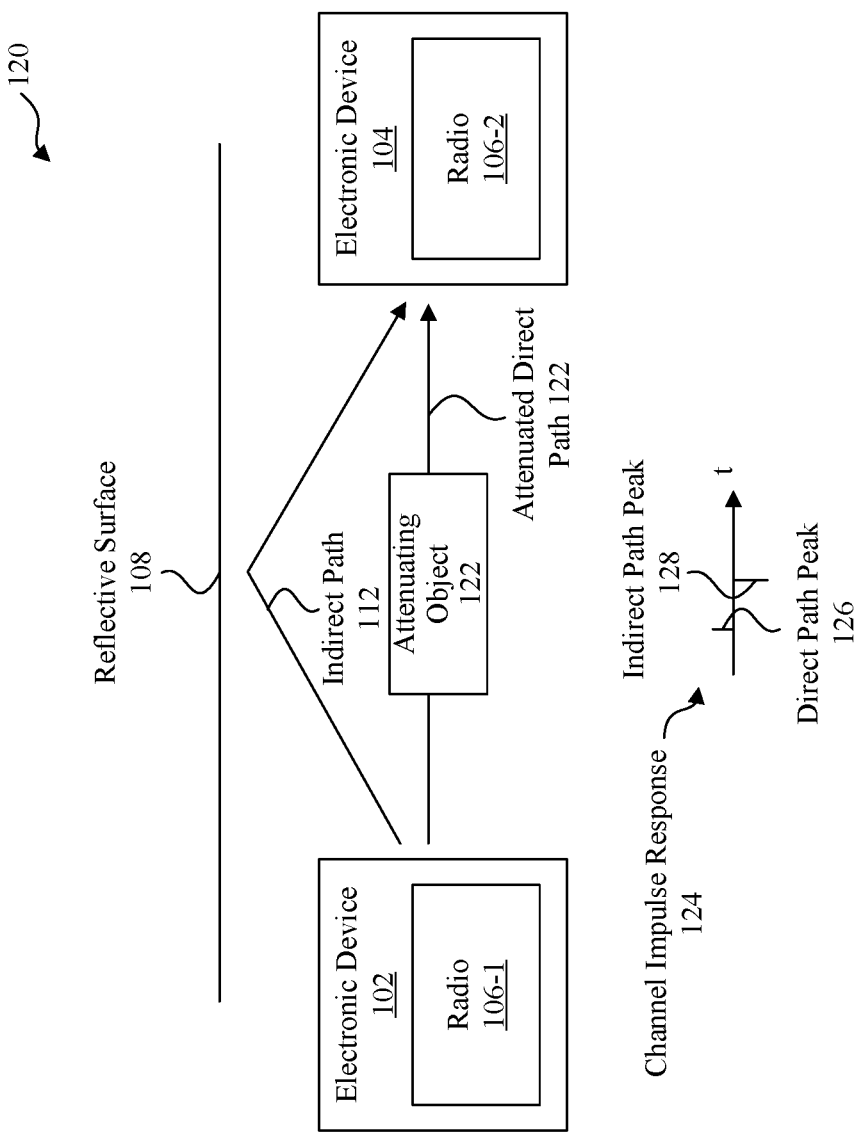
FIG. 1C illustrates a diagram of an exemplary set of electronic devices with multipath reflection and attenuation, in accordance with some embodiments of the disclosure.

FIG. 1C illustrates a diagram 120 of an exemplary set of electronic devices 102 and 104 with both multipath reflection and attenuation. Electronic device 102 may send a transmission using the wireless subsystem 106-1 to electronic device 104, which receives the transmission using the wireless subsystem 106-2. The transmission may traverse attenuated direct path 122, which represents the shortest distance path between electronic devices 102 and 104. But, the signal received via attenuated direct path 122 may be attenuated by attenuating object 122 (e.g., a structure like furniture or a wall), thereby reducing the total energy received via attenuated direct path 122. The transmission may also traverse indirect path 112 and be received by the second electronic device 104 later than via the attenuated direct path 122. The resulting channel impulse response 124 estimated by electronic device 104 can include a weaker direct path peak 126 and a stronger indirect path peak 128. A noted hereinabove, there may be any number of propagation paths, some stronger and some weaker resulting in an estimated channel impulse response (CIR) having multiple peaks, and the estimated CIR 124 shown in FIG. 1C is exemplary but not limiting. Electronic device 104 may still distinguish between the peaks, however, direct path peak 126 of FIG. 1C can have a reduced signal strength that may be more difficult to separate from receiver noise and other signal distortion phenomena than the direct path peak 116 of FIG. 1B.

Figure 2A:
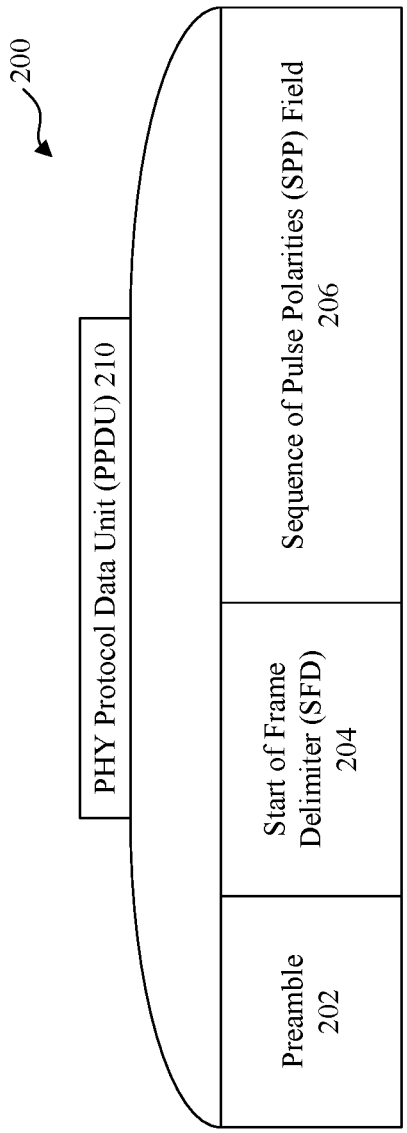
FIG. 2A illustrates a diagram of an exemplary format for a physical layer protocol data unit (PPDU) with no payload, in accordance with some embodiments of the disclosure.
Figure 2B:
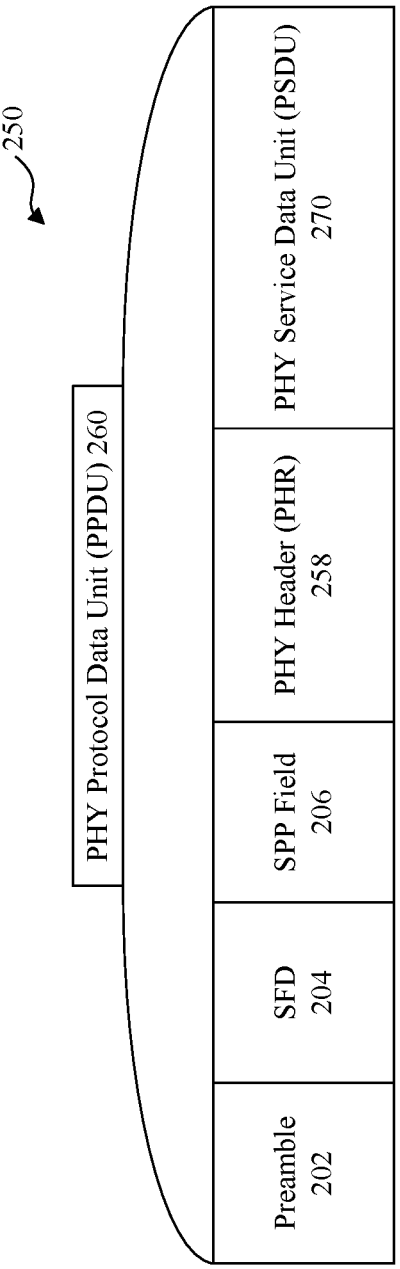
FIG. 2B illustrates a diagram of an exemplary format for a physical layer protocol data unit with a payload, in accordance with some embodiments of the disclosure.

As a convenience and not a limitation, FIGS. 2A and 2B, may be described with elements of FIGS. 1A, 1B, 1C, and 3B. FIG. 2A illustrates a diagram 200 of an exemplary format for a physical layer protocol data unit (PPDU) 210 with no payload, in accordance with some embodiments of the disclosure. PPDU 210 (e.g., a UWB packet) may be transmitted when a secure time-of-arrival calculation (e.g., secure distance measurement) is desired. PPDU 210 includes a preamble 202 which can include a repeated series of pseudo random sequences followed by start of frame delimiter (SFD) 204 separating preamble 202 from SPP field 206. SPP field 206 can include for example, 4096 pulses with a pulse repetition period, T, where T=16 ns.

FIG. 2B illustrates a diagram 250 of an exemplary format for a PPDU 260 with a payload, in accordance with some embodiments of the disclosure. PPDU 260 may be transmitted when data transfer is also desired in addition to secure time-of-arrival calculation. PPDU 260 includes a preamble 202 followed by SFD 204 separating preamble 202 from SPP field 206. PPDU 260 can include physical layer header (PHR) 258 and physical service data unit (PSDU) 270 that includes data.

The accuracy of a channel impulse response (CIR) estimation by electronic devices 102 and 104 can depend on the use of known sequences having desired auto correlation properties. A pseudo random (PR) sequence having a perfect autocorrelation property can produce a positive result with perfect alignment and zero results for all shifted alignments. Known finite length PR sequences having perfect autocorrelation may be included in preambles of wireless transmission packets, where the PR sequence may be repeated several times to aid detection for the start of a wireless transmission packet (e.g., PPDU 210 or PPDU 260) by a receiver, e.g., by the wireless subsystem 106-2 of electronic device 104. As the PR sequence used for the preamble 202 and/or pulses of SPP field 206 are known, the wireless subsystem 106-2 of electronic device 104 can readily receive and detect the start of a wireless transmission packet. But, as described in FIG. 3A below, other electronic devices may also listen for and detect the same wireless transmission packet and may interfere with proper detection by electronic device 104.

FIG. 3A illustrates a diagram 300 of an example of a malicious actor electronic device 302 interfering with communication between a set of electronic devices 102 and 104.

As a convenience and not a limitation, FIG. 3A may be described with elements of FIGS. 1A, 1B, 1C, 2A, 2B, and 3B. In the example, electronic device 102 sends legitimate transmission 304 to electronic device 104. Malicious actor electronic device 302 may receive a sniffed transmission 306, such as a portion of legitimate transmission 304, and after recognizing a PR sequence used for preamble 202 or recognizing portions of SPP field 206 of legitimate transmission 304, may send spoofed transmission 308 to electronic device 104 reusing the PR sequence or portions of SPP field 206 to potentially cause electronic device 104 to incorrectly recognize malicious actor electronic device 302 as the legitimate transmitter instead of electronic device 102. When that occurs, electronic device 104 can determine an incorrect time-of-arrival and an incorrect distance between electronic device 102 and electronic device 104. The impact of the incorrect distance can be demonstrated with regard to system 100 of FIG. 1A. If the incorrect distance was determined between wireless communication device 190 and ticket entry device 150, ticket entry device 150 may open too early and/or close too early and a user of wireless communication device 190 may not be able to gain entry as desired and intended. And, a user of malicious actor electronic device 302 may be able to gain entry through ticket entry device 150.

In some attacks, malicious actor electronic device 302 can react quickly during the preamble transmission from electronic device 102 to electronic device 104 by injecting to the wireless medium a malicious actor preamble signal, using preamble intervals that are identical to those transmitted by electronic device 102 such that spoofed transmission 308 received at electronic device 104 appears time-advanced relative to legitimate transmission 304 received at electronic device 104. When such malicious actor preamble signals are used for wireless ranging, electronic device 104 may erroneously determine that malicious actor electronic device 302 is the closest (based on the timing advance), legitimate (based on the known PR sequence or SPP) electronic device, based on channel impulse response (CIR) estimation at a physical layer.

Figures 9A, 9B:
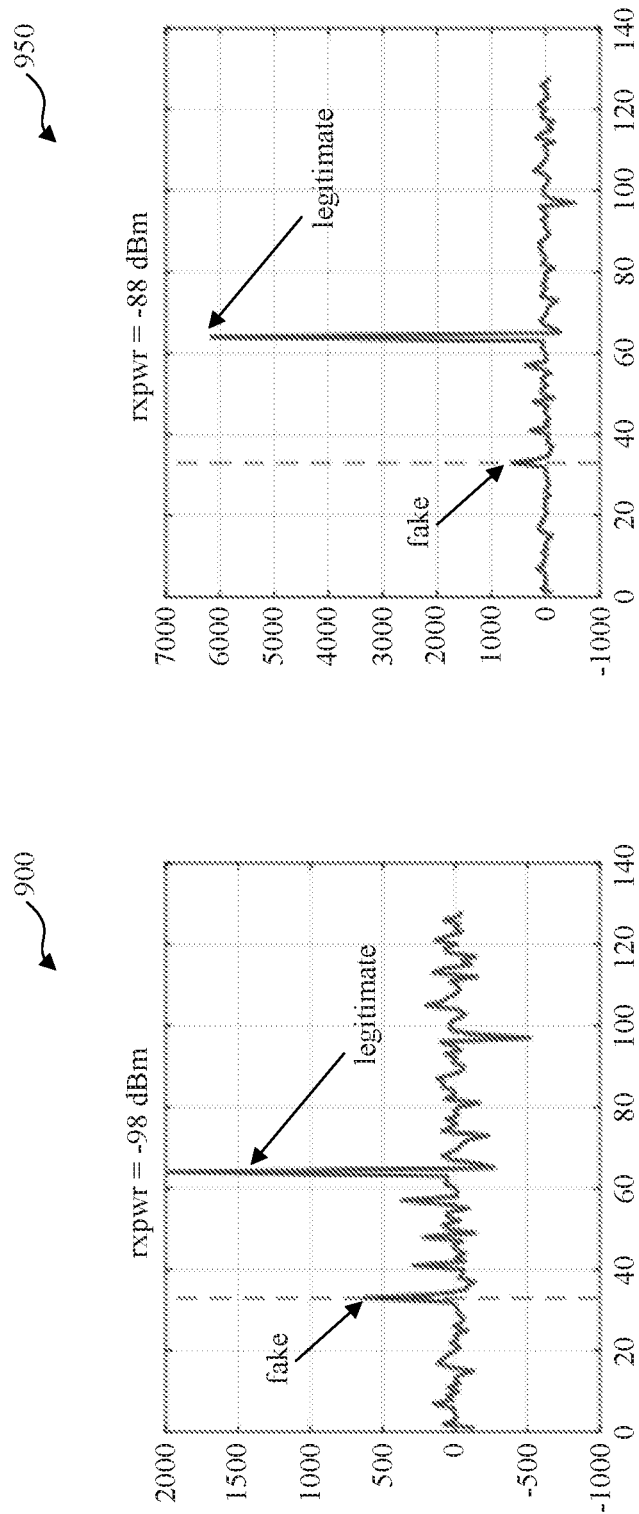
FIGS. 9A and 9B illustrate the vulnerability of first-path extraction systems with a malicious actor electronic device interfering with communication between a set of electronic devices at different received power levels.

FIGS. 9A and 9B illustrate the vulnerability of first-path extraction systems with a malicious actor electronic device 302 interfering with communication between a set of electronic devices 102 and 104. As a convenience and not a limitation, FIGS. 9A and 9B may be described with elements from previous figures. CIR estimation 900 illustrates that a first-path extraction system that relies only on CIR estimation (based either on the known PR sequence or the SPP) for a secure time-of-arrival calculation can be fooled by spoofed transmission 308 of FIG. 3A that can show up as the fake first path compared to a legitimate first path that arrives at a later time. When a receiver of electronic device 104 receives spoofed transmission 308, electronic device 104 may use the fake first path to determine the time-of-arrival calculation and thus calculate an incorrect distance between electronic device 102 and itself, electronic device 104. And, if electronic device 102 is for example, wireless communication device 190 of system 100 in FIG. 1A, and electronic device 104 is any of the other electronic devices of system 100, then the applications may not have the desired effects as described above. CIR estimation 950 illustrates a similar result at a different received power level. To address the vulnerability of first-path extraction systems, some embodiments include an apparatus, method, and computer program product for secure time-of-arrival calculations such as UWB systems.

Figure 4:
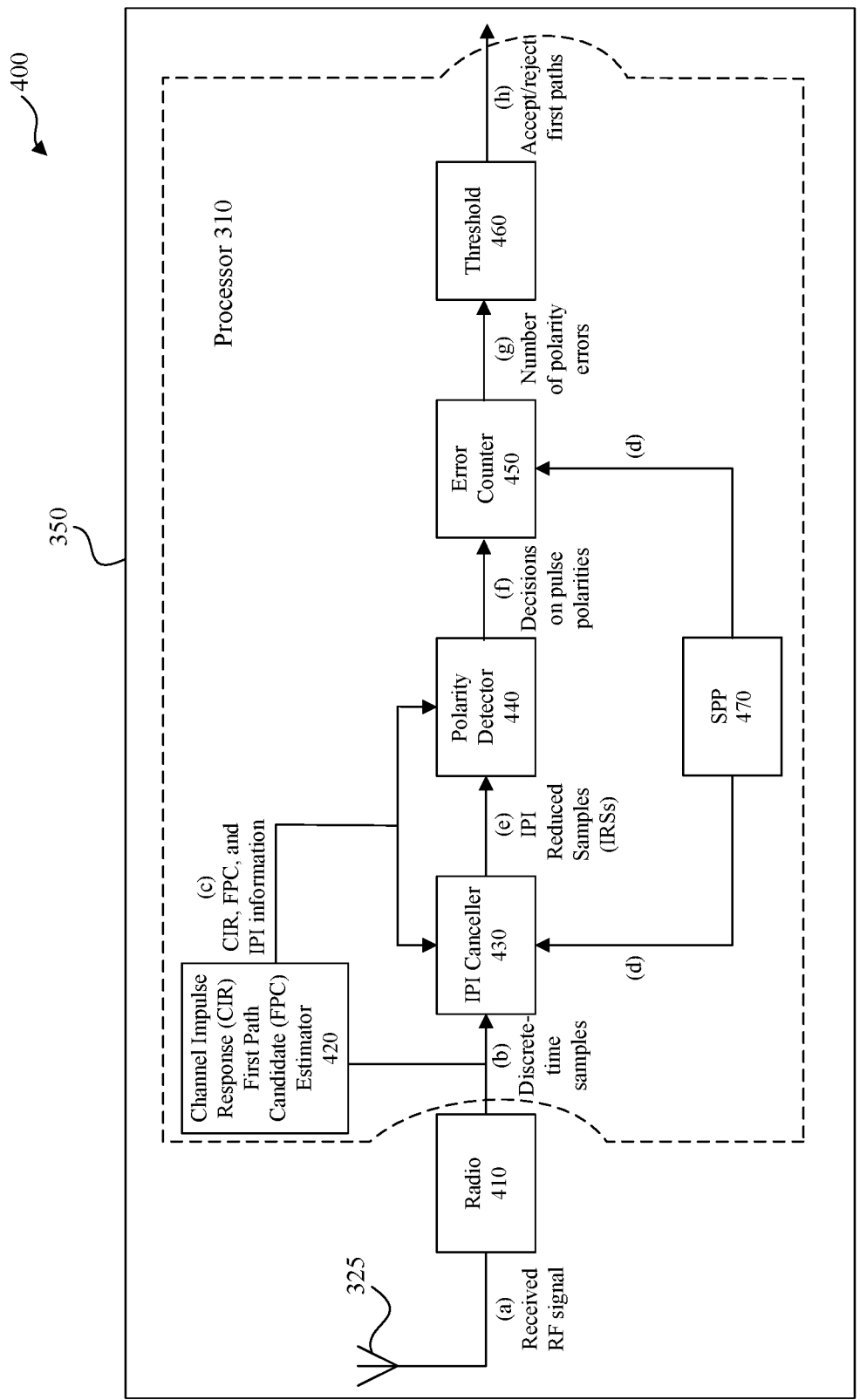
FIG. 4 illustrates a receiver block diagram of an example wireless system for secure time-of-arrival calculation, according to some embodiments of the disclosure.

FIG. 4 illustrates a receiver block diagram of an example wireless system 400 for secure time-of-arrival calculation, according to some embodiments of the disclosure. As a convenience and not a limitation, FIG. 4 may be described with elements from previous figures. For example, wireless system 400 may be implemented by wireless system 350 of FIG. 3B, with antenna 325, and processor 310. Wireless system 400 can be any electronic device of system 100 of FIG. 1. As an example, and not a limitation, wireless system 400 can be that of electronic device 104 of FIG. 3A. Some embodiments rely on a known periodic sequence which may be based on the preamble 202 or SPP field 206 of FIG. 2A or 2B. For convenience and not a limitation, the examples herein utilize SPP field 206 that includes for example, 4096 pulses with a pulse repetition period, T, where T=16 ns.

FIG. 4 illustrates a receiver block diagram of electronic device 104 that determines whether a received transmission is legitimate transmission 304 or spoofed transmission 308. Wireless system 400 a utilizes channel impulse response (CIR) estimates based on a known sequence as well as the SPP affiliated with legitimate transmission 304 to verify that the wireless transmission received is indeed legitimate transmission 304. If for example, the wireless transmission received is actually spoofed transmission 308, then the processes of wireless system 400 that utilize CIR estimates as well as the SPP affiliated with legitimate transmission 304 can determine that the wireless transmission received is not legitimate transmission 304. Thus, some embodiments of the disclosure are an improvement over first-path extraction systems of FIGS. 9A and 9B because some embodiments can distinguish legitimate transmission 304 received from spoofed transmission 308 received.

Wireless receiver system 400 includes radio 410, channel impulse response (CIR) FPC estimator 420, inter-pulse interference (IPI) canceller 430, polarity detector 440, SPP 470, error counter 450, and threshold 460. Radio 410 receives (a) transmission such as an RF signal, via one or more antennas and converts the RF signal to (b) discrete-time samples. CIR FPC estimator 420 receives (b) discrete-time samples, and determines (c) CIR, FPC, and inter pulse interference (IPI) information that can include channel coefficient and timing estimates that identify a CIR including estimates of one or more propagation paths including FPCs and subsequent reflected paths (e.g., IPI components) as shown in FIG. 6B.) The IPI components can be spaced from the FPCs by multiples of T, the temporal distances between pulses in the transmitted SPP field 206. Thus, (c) CIR, FPC, and IPI information identify the IPI components at multiples of T. SPP 470 generates (d) SPP pulse polarities that are known to both the transmitting electronic device (e.g., electronic device 102) and the receiving electronic device (e.g., electronic device 104).

IPI canceller 430 uses (c) CIR, FPC, and IPI information to remove from FPCs, respective IPI components at multiples of T based on (d) SPP field 206, from (b) discrete-time samples. Thus, IPI canceller 430 yields (e) IPI-reduced samples (IRSs) on FPCs.

Polarity detector 440 uses (c) CIR, FPC, and IPI information (e.g., the first path channel coefficient estimate) to perform bit detection for each sample of the (e) IRSs. For example, polarity detector 440 can estimate a polarity sequence. Polarity detector 440 yields (t) decisions on pulse polarities at multiples of T.

Error counter 450 compares the (t) decisions on pulse polarities (e.g., estimated bit values) with (d) SPP field 206, and yields (g) the number of polarity errors.

Threshold 460 compares whether or not (g) the number of polarity errors are considered a match with SPP field 206. For example, threshold 460 determines whether (g) the number of polarity errors satisfies a configurable threshold value (e.g., below a given bit error rate (BER) and is considered a match, or exceeds a given BER and is not considered a match). Threshold 460 yields (h) an accepted or rejected first path (e.g., accepts the received wireless transmission at (a) as legitimate transmission 304 or rejects the received wireless transmission at (a) as a not being legitimate transmission 304 (e.g., as spoofed transmission 308.)

Figure 5:
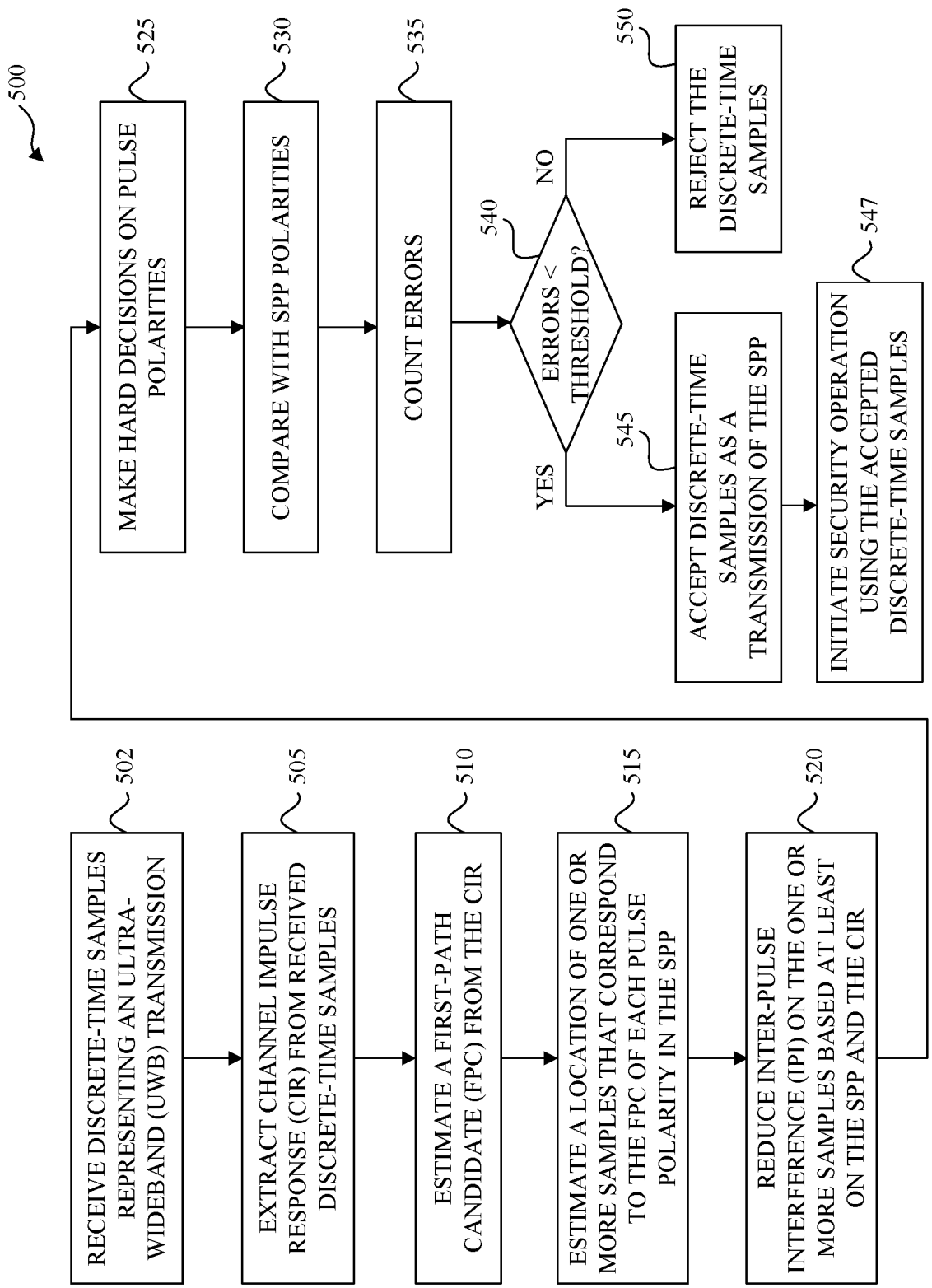
FIG. 5 illustrates a method for an example wireless system with a receiver for secure time-of-arrival calculation, according to some embodiments of the disclosure.

FIG. 5 illustrates method 500 for an example wireless system 400 with a receiver for secure time-of-arrival calculation, according to some embodiments of the disclosure. As a convenience and not a limitation, FIG. 5, may be described with elements from previous figures. Method 500 may be performed by wireless system 350 of FIG. 3B and any electronic devices of system 100 of FIG. 1A.

At 502, method 500 receives discrete-time samples representing a UWB transmission of SPP field 206.

At 505, method 500 extracts a channel impulse response (CIR) from the received discrete-time samples. For example, a processor performing CIR FPC estimator 420 functions can receive discrete-time samples and estimate the CIR.

At 510, method 500 estimates a FPC of each pulse polarity in the SPP (e.g., using timing and coefficients of the CIR.)

At 515, method 500 estimates a location of one or more samples that correspond to the FPC of each pulse polarity in the SPP (e.g., use timing and coefficient of paths that create IPI components such as second path components and/or reflected path components on subsequent FPCs.)

At 520, method 500 reduces IPI on the one or more samples based at least on the SPP and the CIR (e.g., utilizes pulse locations at multiples of T of SPP field 206) to cancel out IPI components from discrete-timing samples received, where the discrete-timing samples include first path components and IPI components that correspond to the location of pulses at multiples of T of the SPP.) The result of cancelling the IPI components yields IRSs (e.g., IPI-free samples) received on first paths located at multiples of T. In other words, method 500 generates one or more IPI reduced samples (IRS) that correspond to the FPC of each pulse polarity in the SPP.

At 525, method 500 makes decisions on pulse polarities (e.g., by using first path channel coefficient estimates to equalize the IRSs received on first paths located at multiples of T.) The channel equalization may include phase rotations of the IPI-free samples received on first paths. The output of the channel equalization performed by a processor performing polarity detector 440 functions, are estimated bit values.

At 530, method 500 compares the estimated bit values with the SPP polarities.

At 535, method 500 counts the number of errors based on the comparison at 530.

At 540, method 500 determines whether the number of errors counted satisfies a threshold. For example, a determination is made whether the number of errors counted is less than a configurable threshold value (e.g., a BER). When the number of errors counted is less than the configurable threshold value, method 500 proceeds to 545. When the number of errors counted is greater than the configurable threshold value, method 500 proceeds to 550.

At 545, method 500 accepts the discrete-time samples as a transmission of SPP field 206 (e.g., as legitimate transmission 304.)

At 547, method 500 initiates a security operation using the accepted discrete-time samples. For example, as shown in FIG. 1A, entry transponder device 140 enables a car door (e.g., unlocks or opens a vehicle door), entry to a building, or ticket entry device 150 allows a ticket that enables entry to a venue. Other security operations are possible.

At 550, method 500 rejects the discrete-time samples as not being a transmission of SPP field 206 (e.g., as spoofed transmission 308.)

Figure 6A:
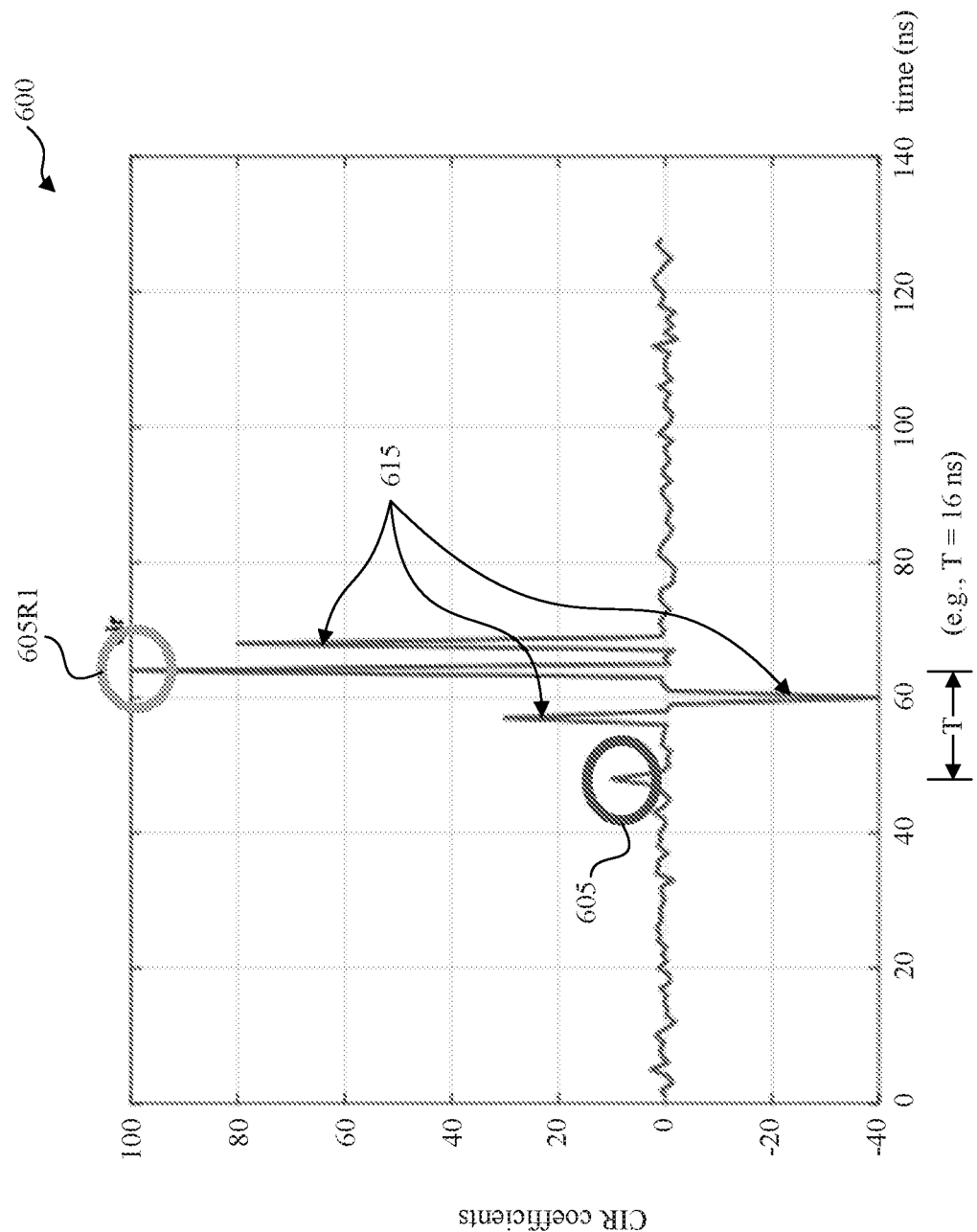
FIG. 6A illustrates an estimate of a channel impulse response (CIR) of analog to digital converter (ADC) samples received by an example wireless system, according to some embodiments of the disclosure.
Figure 6B:
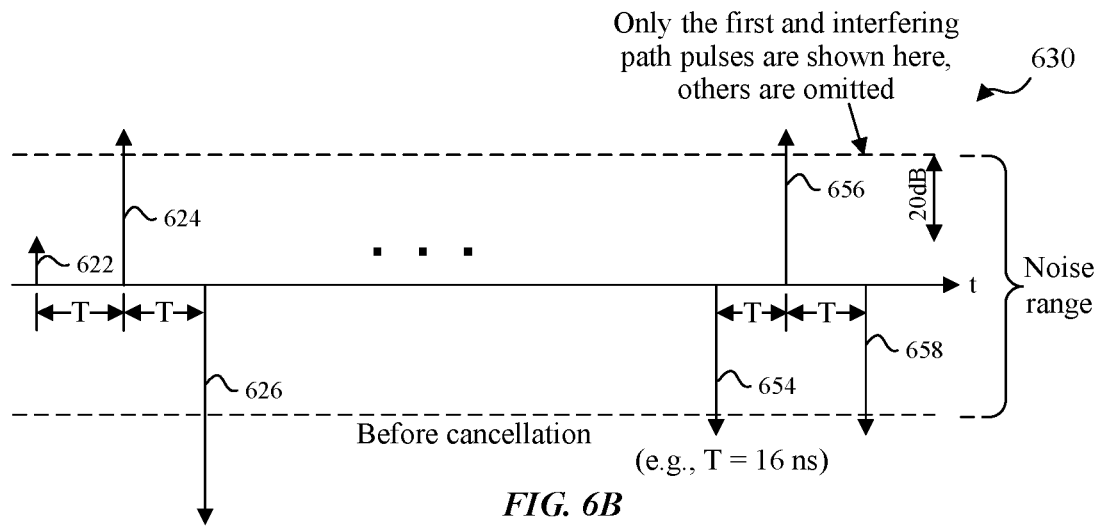
FIG. 6B illustrates a wireless transmission received by an example wireless system, according to some embodiments of the disclosure.
Figure 6C:
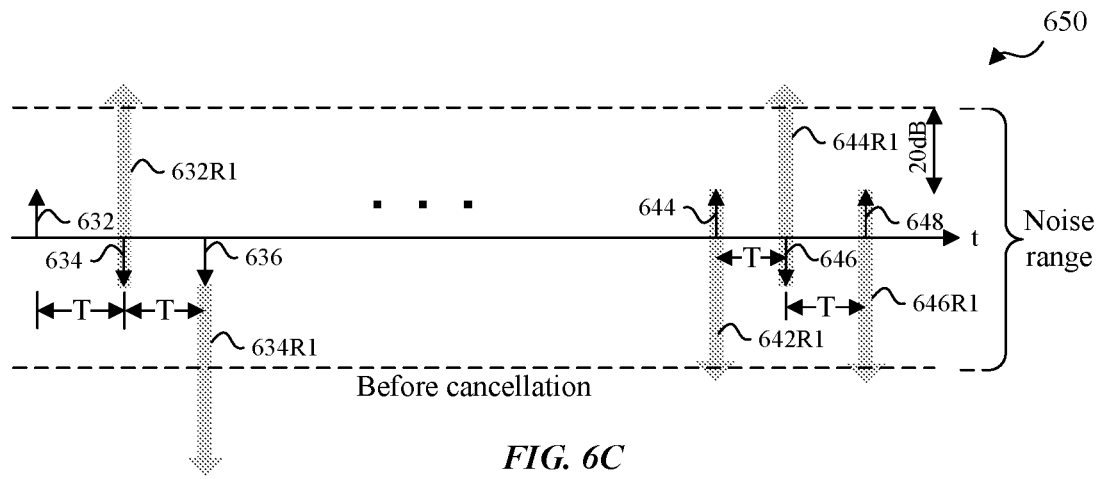
FIG. 6C illustrates first path components and inter-pulse interference (WI) components of a wireless transmission received by an example wireless system, according to some embodiments of the disclosure.
Figure 6D:
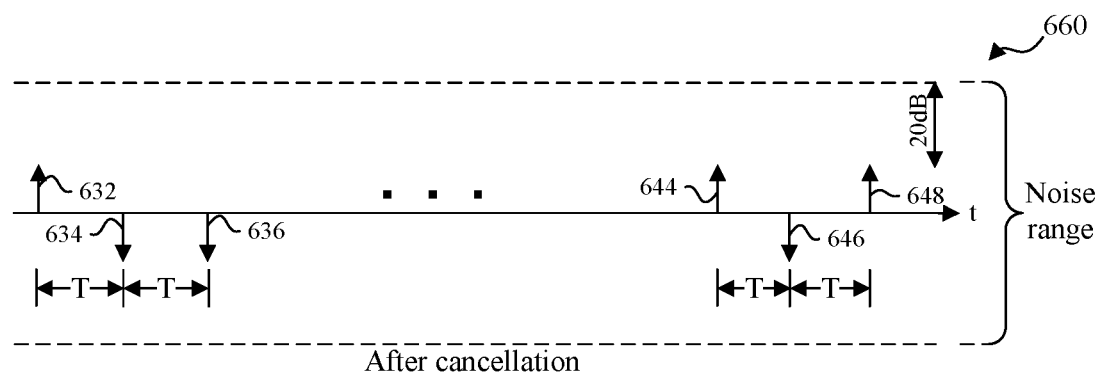
FIG. 6D illustrates first path components after cancellation of inter-pulse interference (IPI) components of a wireless transmission received by an example wireless system, according to some embodiments of the disclosure.

FIGS. 6A-6D illustrates signals associated with FIG. 4. For example, FIG. 6A illustrates the output of channel estimator 420; FIG. 6B illustrates the output signal of radio 410; FIG. 6C illustrates components that make up the output signal of radio 410; and FIG. 6D illustrates the output of IPI canceller 430. As a convenience and not a limitation, FIGS. 6A-6D may be described with elements from previous figures.

FIG. 6A illustrates an estimate of a channel impulse response (CIR) 600 (e.g., (c) channel coefficient and timing estimates) of (b) ADC samples received by an example wireless system 400, according to some embodiments of the disclosure. CIR estimate 600 identifies a first path candidate 605 and a reflection of first path candidate 605, 605R1, at multiples of T, the temporal distances between pulses in the transmitted SPP field 206. While other signals 615 are identified, they are ignored because they are not located at a location that is a multiple of T. Recall that the period, T, is determined when the known sequence SPP field 206 is selected. Although only the first path candidate 605 and the reflection of first path candidate 605, namely 605R1, are shown (c) channel coefficient and timing estimates are assumed to also identify the IPI components at multiples of T (e.g., 632R1, 634R1, . . . 642R1, 644R1, and 646R1 of FIG. 6C) that are spaced by multiples of T which are described below with regard to FIGS. 6B and 6C.

FIG. 6B illustrates a wireless transmission 630 received by an example wireless system 400, according to some embodiments of the disclosure. The one or more samples shown in wireless transmission 630 includes signals 622, 624, 626, . . . 654, 656, 658 and so on which are a subset of (b) discrete-time samples of FIG. 4 that are identified using (c) CIR, FPC, and IPI information of FIG. 4. Some embodiments first assume that the signals of wireless transmission 630 include FPCs of each pulse polarity of SPP field 206 superimposed with (e.g., added with) inter-pulse interference (IPI) components of earlier pulses at that location (e.g., multiple of T). While there may be many reflected paths that contribute to the IPI components, for convenience and not a limitation, examples herein describe the IPI from reflected second path components.

FIG. 6C illustrates first path components and inter-pulse interference (WI) components of a wireless transmission 650 received by an example wireless system 400, according to some embodiments of the disclosure. For example, signal 622 of FIG. 6B is assumed to be the First-Path Candidate (FPC) of legitimate transmission 304 and is shown as a first path of pulse 632 of FIG. 6C. Signal 624 of FIG. 6B is assumed to include a superposition of a first path of pulse 634 plus the WI component (e.g., interference) due to a reflection of pulse 632, 632R1 component, at that location shown in FIG. 6C. In other words, 632R1 component is assumed to be a second path reflection of pulse 632. Note that first path of pulse 634 has a negative polarity while 632R1 component with a stronger receive signal has a positive polarity, and the superposition yields a signal 624 of a positive polarity at that location in FIG. 6B. Signal 626 of FIG. 6B is assumed to include first path of pulse 636 superpositioned with a reflection of pulse 634, 634R1 component. Since both first path of pulse 636 and 634R1 component have negative polarities, their superposition is assumed to yield a negative polarity shown as signal 626 of FIG. 6B. Similarly, signal 654 of FIG. 6B is assumed to include first path of pulse 644 superpositioned with a reflection of pulse 642, 642R1 component. Signal 656 of FIG. 6B is assumed to include first path of pulse 646 superpositioned with a reflection of pulse 644, 644R1 component. Signal 658 of FIG. 6B is assumed to include first path of pulse 648 superpositioned with a reflection of pulse 646, 646R1 component.

FIG. 6D illustrates first path components 660 after cancellation of IPI components of a wireless transmission received by an example wireless system, according to some embodiments of the disclosure, (e) IRSs. Thus, the (c) CIR, FPC, and IPI information are assumed to identify the IPI components at multiples of T (e.g., 632R1, 634R1, . . . 642R1, 644R1, and 646R1 of FIG. 6C) that are spaced by multiples of T which are described below with regard to FIGS. 6B and 6C. When (a) received RF signal is indeed legitimate transmission 304, first path components 660 can be substantially equivalent to the SPP (e.g., SPP field 206) as shown in this example. Polarity detector 440, error counter 450, and threshold 460 functions together confirm the substantial equivalence. When (a) received RF signal is actually not legitimate transmission 304 (e.g., is spoofed transmission 308), first path components 660 can be different from the known SPP (e.g., SPP field 206.) In some embodiments, polar detector 440, error counter 450, and threshold 460 functions together confirm the difference and some embodiments would reject (a) received RF signal as a false signal such as detected spoofed transmission 308.

Figure 7:
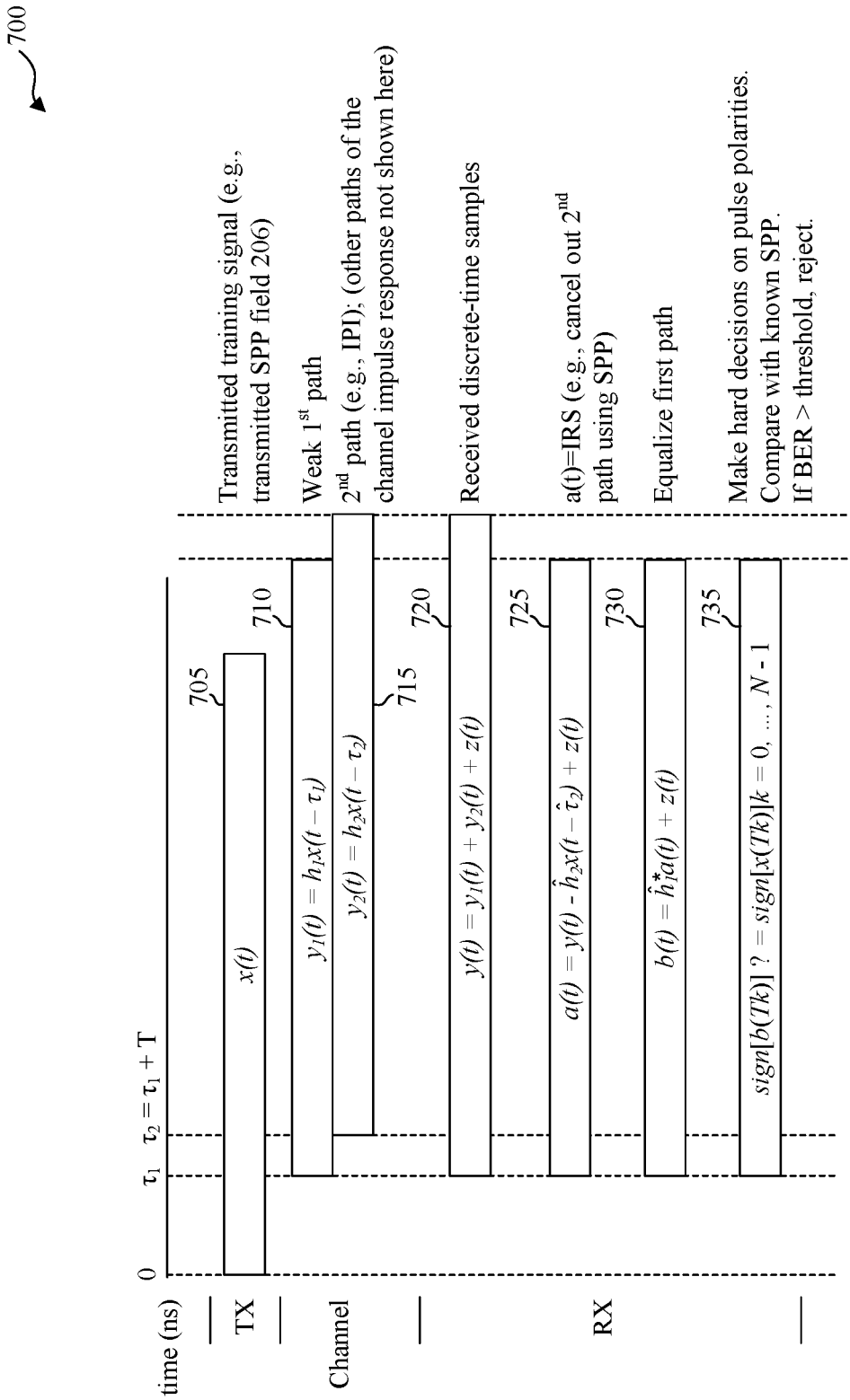
FIG. 7 illustrates signals of an example wireless system, with a receiver for secure time-of-arrival calculation, according to some embodiments of the disclosure.

FIG. 7 illustrates signals 700 of an example wireless system 700, with a receiver for secure time-of-arrival calculation, according to some embodiments of the disclosure. As a convenience and not a limitation, FIG. 7 may be described with elements from previous figures. Wireless system 700 can include transmitters and receivers. The electronic devices that transmit as well as the electronic devices that receive may be wireless system 350 of FIG. 3B and any electronic devices of system 100 of FIG. 1A. The receiver functions may be performed by wireless system 400 of FIG. 4.

An electronic device transmits signal 705, namely x(t), at time, t=0. In an example, x(t) can be a transmitted training signal such as SPP field 206.

After a delay at $t=\tau_1$, signal 710, a weak first path signal traverses the channel; the weak first path signal is characterized as $y_1(t)=h_1 x(t-\tau_1)$.

After another delay at $t=\tau_2$, signal 715, a strong second path signal such as IPI signals also traverse the channel, where $\tau_2=\tau_1+T$, where T is the pulse repetition period; the strong second path signal is characterized as $y_2(t)=h_2 x(t-\tau_2)$. While other paths of the channel impulse response may exist, for convenience, they are not shown here.

Signal 720 includes y(t) that is equivalent to (b) discrete-time samples of FIG. 4. Radio 410 of FIG. 4 receives a noisy analog signal and at time t, yields a noisy sampled signal characterized as $y(t)=y_1(t)+y_2(t)+z(t)$. Note that for simplicity, a continuous time notation is used for signals in this and subsequent paragraphs, indicated by the notation "(t)" for the time t at which the respective signal is evaluated. In a practical state of the art system, however, the time at which signals are observed and processed will be quantized such that t=Ts*n, where t is Ts is the sampling interval and n is the discrete time index. In what follows, it is understood that signal t refers to a sequence of discrete time instances.

IPI canceller 430 functions of FIG. 4 can be performed by a processor (e.g., processor 310 of FIG. 4) that estimates and cancels the strong second path signal using the CIR and SPP.

The resulting signal 725 can be characterized as: $a(t)=y(t)-\hat{h}_2 x(t-\hat{\tau}_2)+z(t)$, which can be equivalent to (e) IRSs of FIG. 4.

Polarity detector 440 functions of FIG. 4 can be performed by a processor (e.g., processor 310 of FIG. 4) that equalizes the resulting signal to produce signal 730. Signal 730 which can be characterized as $$b(t)=\hat{h}_1 a(t)+z(t).$$

Polarity detector 440 functions of FIG. 4 can be performed by a processor (e.g., processor 310 of FIG. 4) that also determines whether the pulse polarities are positive or negative, and then compares the determined pulse polarities with the known SPP to determine whether received noisy signal 720 was the legitimate expected transmission (e.g., legitimate transmission 304) or not. The result of the determination signal 735 can be characterized as:

$$\text{sign}[b(Tk)]?=\text{sign}[x(Tk)]k=0,\ldots,N-1.$$

For example, based on the comparison and the number of errors (e.g., bit error rate (BER)) being less than a given threshold value, received noisy signal 720 is considered to be legitimate transmission 304 of FIG. 3A (e.g., not a spoofed transmission 308.) In this example, the transmission x(t) is a legitimate transmission 304 of FIG. 3A, and x(t) is a transmission of SPP field 206.

In some embodiments, the determination whether the wireless transmission is from the legitimate transmitter can be based on the concept of a normalized correlation. Specifically, a correlation metric between signal a(t) and the SPP can be utilized, where correlation refers to an inner vector product, computed by conducting pairwise multiplication of samples of a(t) with corresponding polarity values in the SPP and summing up the results of this multiplication over the entirely of the SPP. The normalization starts by computing the sample norm of a(t), which comprises computing the squared magnitude $|a(t)|^2$ of each sample in a(t) and computing the average of this metric over all samples in a(t). Finally, to arrive at the normalized correlation, a ratio is calculated between the absolute value of the correlation (or inner product) and the sample norm. To determine whether the wireless transmission is legitimate, that is indeed a transmission of the expected SPP, the normalization correlation is compared to a configurable threshold.

Figure 8:
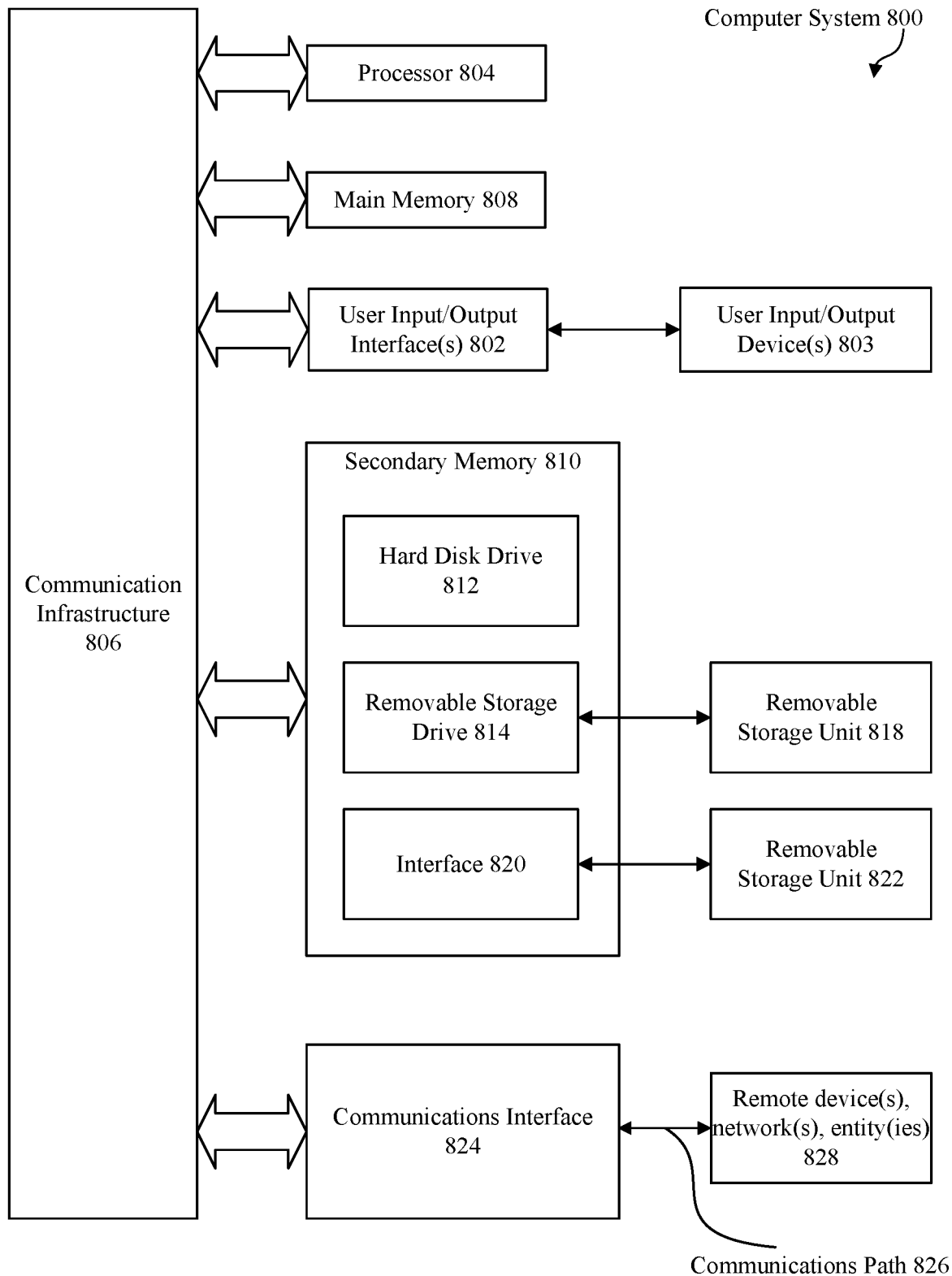
FIG. 8 is an example computer system for implementing some embodiments or portion(s) thereof.

Various embodiments can be implemented, for example, using one or more computer systems, such as computer system 800 shown in FIG. 8. Computer system 800 can be any well-known computer capable of performing the functions described herein. For example, and without limitation, electronic devices such as laptops, desktops as described with regard to FIG. 1A and/or other apparatuses and/or components shown in the figures. The laptops and desktops or other wireless devices may include the functions as shown in system 350 of FIG. 3B and/or some or all of method 500 of FIG. 5, and wireless system 400 of FIGS. 4 and 7 respectively. For example, computer system 800 can be used in wireless devices to exchange UWB packet structures that enable secure time-of-arrival calculation between wireless devices.

Computer system 800 includes one or more processors (also called central processing units, or CPUs), such as a processor 804. Processor 804 is connected to a communication infrastructure or bus 806. Computer system 800 also includes user input/output device(s) 803, such as monitors, keyboards, pointing devices, etc., that communicate with communication infrastructure 806 through user input/output interface(s) 802. Computer system 800 also includes a main or primary memory 808, such as random access memory (RAM). Main memory 808 may include one or more levels of cache. Main memory 808 has stored therein control logic (e.g., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 includes a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 reads from and/or writes to removable storage unit 818 in a well-known manner.

According to some embodiments, secondary memory 810 may include other means, instrumentalities or other approaches for allowing computer programs and/or other instructions and/or data to be accessed by computer system 800. Such means, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 enables computer system 800 to communicate and interact with any combination of remote devices, remote networks, remote entities, etc. (individually and collectively referenced by reference number 828). For example, communication interface 824 may allow computer system 800 to communicate with remote devices 828 over communications path 826, which may be wired and/or wireless, and which may include any combination of LANs, WANs, the Internet, etc. Control logic and/or data may be transmitted to and from computer system 800 via communication path 826.

The operations in the preceding embodiments can be implemented in a wide variety of configurations and architectures. Therefore, some or all of the operations in the preceding embodiments may be performed in hardware, in software or both. In some embodiments, a tangible apparatus or article of manufacture includes a tangible computer useable or readable medium having control logic (software) stored thereon is also referred to herein as a computer program product or program storage device. This includes, but is not limited to, computer system 800, main memory 808, secondary memory 810 and removable storage units 818 and 822, as well as tangible articles of manufacture embodying any combination of the foregoing. Such control logic, when executed by one or more data processing devices (such as computer system 800), causes such data processing devices to operate as described herein.

Based on the teachings contained in this disclosure, it will be apparent to persons skilled in the relevant art(s) how to make and use embodiments of the disclosure using data processing devices, computer systems and/or computer architectures other than that shown in FIG. 8. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative embodiments may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

What is claimed is:

1. An electronic device, comprising:
a transceiver configured to receive wireless transmissions from a second electronic device;
a processor, coupled to the transceiver, configured to:
receive discrete-time samples that correspond to a received wireless transmission;
estimate a channel impulse response (CIR) comprising estimates of one or more propagation path coefficients based at least on the discrete-time samples and a sequence of pulse polarities (SPP);
based on the CIR, estimate a First-Path Candidate (FPC) corresponding to the SPP;
reduce inter-pulse interference (IPI) on one or more samples that correspond to the FPC; and
after the reduction, determine based at least on the SPP, whether the one or more samples represents a legitimate transmission of the SPP.

2. The electronic device of claim 1, wherein to reduce the IPI, the processor is configured to:
estimate interference on the one or more samples from preceding pulses in the SPP, wherein the estimate is based at least on the SPP and the CIR; and
subtract the estimated interference from the one or more samples.

3. The electronic device of claim 1, wherein to determine based at least on the SPP whether the one or more samples represent a legitimate transmission of the SPP, the processor is configured to:
estimate a polarity sequence of the one or more samples;
compare the estimated polarity sequence with the SPP;
determine whether the comparison satisfies a configurable threshold; and
based on the determination, initiate a security operation.

4. The electronic device of claim 3, wherein to estimate the polarity sequence, the processor is configured to:
equalize the one or more samples based on the one or more propagation path coefficients of the FPC; and
estimate polarities of the equalized one or more samples.

5. The electronic device of claim 1, wherein the SPP is a cryptographically secure pulse sequence (CSPS) or a training sequence of a physical layer protocol data unit (PPDU).

6. The electronic device of claim 1, wherein to determine based at least on the SPP whether the one or more samples represents a legitimate transmission of the SPP, the processor is configured to:
compute a correlation between the one or more samples and the SPP;
compute a sample norm of the one or more samples;
compute a ratio between a magnitude of the correlation and the sample norm; and
determine whether the ratio exceeds a configurable threshold.

7. The electronic device of claim 6, wherein the sample norm comprises a square-root of a sum of squared magnitudes of the one or more samples.

8. A method, comprising:
receiving discrete-time samples that correspond to a received wireless transmission;
estimating a channel impulse response (CIR) comprising estimates of one or more propagation path coefficients based at least on the discrete-time samples;
estimating, based at least on the CIR, a First-Path Candidate (FPC) corresponding to a sequence of pulse polarities (SPP);
generating one or more inter-pulse interference (IPI) reduced samples (IRSs) based at least on the SPP and the CIR that correspond to the FPC; and
after the reducing, determining whether the one or more IRSs represent a legitimate transmission of the SPP.

9. The method of claim 8, wherein the generating the one or more IRSs comprises:
based on the SPP and the CIR, estimating a subset of the discrete-time samples;
estimating interference on the subset of the discrete-time samples from preceding pulses in the SPP; and
cancelling the estimated interference from the subset of the discrete-time samples.

10. The method of claim 8, wherein the determining whether the one or more IRSs represent a legitimate transmission of the SPP comprises:
- estimating a polarity sequence of the one or more IRSs;
- comparing the estimated polarity sequence with the SPP; and
- determining whether the comparison satisfies a configurable threshold.

11. The method of claim 10, wherein the estimating the polarity sequence comprises:
- equalizing the one or more IRSs based on the one or more propagation path coefficients of the FPC; and
- estimating polarities of the equalized one or more IRSs.

12. The method of claim 8, wherein the SPP is a cryptographically secure pulse sequence (CSPS) or a training sequence of a physical layer protocol data unit (PPDU).

13. The method of claim 8, wherein the determining whether the one or more IRS s represents a legitimate transmission of the SPP comprises:
- computing a correlation between the one or more IRSs and the SPP;
- computing a sample norm of the one or more IRSs;
- computing a ratio between a magnitude of the correlation and the sample norm; and
- determining whether the ratio exceeds a configurable threshold.

14. The method of claim 13, wherein the sample norm comprises a square-root of a sum of squared magnitudes of the one or more IRSs.

15. A non-transitory computer-readable medium storing instructions that, when executed by a processor of a first electronic device, cause the processor to perform operations, the operations comprising:
- receiving discrete-time samples that correspond to a received wireless transmission;
- estimating a channel impulse response (CIR) comprising estimates of one or more propagation path coefficients based at least on the discrete-time samples;
- estimating, based at least on the CIR, a First-Path Candidate (FPC);
- based at least on the SPP and the CIR, generating one or more inter-pulse interference (IPI) reduced samples (IRSs) that correspond to the FPC;
- determining, whether the one or more IRSs represent a legitimate transmission of the SPP; and
- based on the determination that the one or more IRSs represent a legitimate transmission of the SPP, performing a security operation.

16. The non-transitory computer-readable medium of claim 15, wherein the generating the one or more IRSs operation comprises:
- based at least on the SPP and the CIR, estimating a subset of the discrete-time samples;
- estimating interference on the subset of the discrete-time samples from preceding pulses in the SPP; and
- subtracting the estimated interference from the subset of the discrete-time samples.

17. The non-transitory computer-readable medium of claim 15, wherein the determining whether the one or more IRSs represent a legitimate transmission of the SPP operation comprises:
- estimating a polarity sequence of the one or more IRSs;
- comparing the estimated polarity sequence with the SPP; and
- determining whether the comparison satisfies a configurable threshold.

18. The non-transitory computer-readable medium of claim 17, wherein the estimating the polarity sequence operation comprises:
- equalizing the one or more IRSs based on the one or more propagation path coefficients of the FPC; and
- estimating polarities of the equalized one or more IRSs.

19. The non-transitory computer-readable medium of claim 15, wherein the determining whether the one or more IRSs represent a legitimate transmission of the SPP operation comprises:
- computing a correlation between the one or more IRSs and the SPP;
- computing a sample norm of the one or more IRSs;
- computing a ratio between a magnitude of the correlation and the sample norm; and
- determining whether the ratio exceeds a configurable threshold.

20. The non-transitory computer-readable medium of claim 19, wherein the sample norm comprises a square-root of a sum of squared magnitudes of the one or more IRSs.

* * * * *